May 27, 1969
R. W. FOSTER-PEGG
3,446,012
GASIFIER AND GAS TURBINE SYSTEM
Filed Nov. 14, 1967
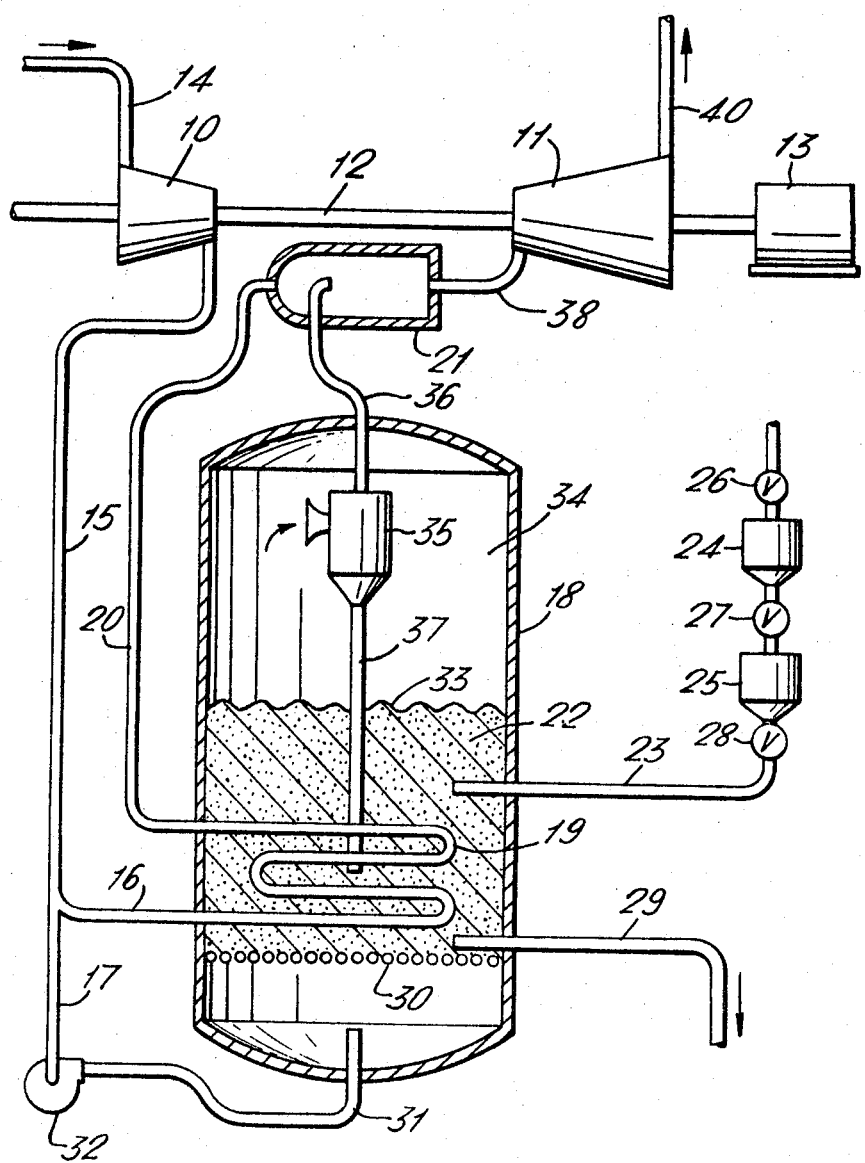

United States Patent Office 3,446,012
Patented May 27, 1969

3,446,012
GASIFIER AND GAS TURBINE SYSTEM
Richard W. Foster-Pegg, Warren, Pa., assignor to Struthers Energy Systems, Inc., a corporation of Delaware
Filed Nov. 14, 1967, Ser. No. 682,966
Claims priority, application Great Britain, Nov. 15, 1966, 51,080/66
Int. Cl. F02c 3/26
U.S. Cl. 60—39.02         7 Claims

ABSTRACT OF THE DISCLOSURE

Coal is gasified to carbon monoxide and other combustible vapors and gases with the production of a great amount of heat in a gasifier. The gasifier is cooled with compressed air which is heated thereby and fed with the products of gasification to a gas turbine.

Background of the invention

The easiest way to gasify carbon in the form of coal is to combine it under controlled conditions with oxygen to form carbon monoxide. The combination of carbon with oxygen to form carbon monoxide releases approximately the same amount of heat per unit weight of the gas produced as does the gas on its complete combustion. Thus the adiabatic gasification of coal to carbon monoxide produces extremely high temperatures comparable to normal furnace temperatures. These temperatures are ameliorated by the reaction of hydrogen with carbon which is endothermic and by the vaporization of moisture in the coal.

Heretofore the temperature of a gasifier has been controlled by the injection of steam; however, this reduces the overall efficiency of the gasifier and the power source using its products for combustion as the latent heat of the steam cannot be recovered. The cooling of a gasifier by the generation of steam which is subsequently used for power generation greatly increases the cost and complexity of a given system. This invention controls the temperature of a gasifier and provides a more efficient gasifier and gas turbine system.

Summary of the invention

Pulverized coal is oxidized in a gasifier which is cooled by compressed air passed through coils in the gasifier. The heated air from cooling the gasifier and carbon monoxide and other products of the gasification are combined and burned and passed through a gas turbine. The main advantage of this invention is a resulting economy of the fuel gas required by the turbine for a given power output. Dust admission and abrasion in the turbine are therefore reduced. Because the cooling air in the coils of the gasifier is compressed, it has a high rate of heat transfer which requires smaller and less costly surface areas of the cooling coils. Further, since the gasifier and gas turbine of this invention may form an integral unit without outside support facilities, the combination may be developed and applied for a wider range of power output applications in self-contained coal powered units. Finally, all the energy of combustion in coal is available to be transformed into power in a gas turbine with the many advantages resulting from the use of a gas turbine.

Brief description of the drawing

The figure of the drawing is a schematic diagram of a gasifier and a turbine according to this invention with the gasifier shown in vertical section.

Description of the preferred embodiment

A compressor 10 and a gas turbine expander 11 are mounted on a common shaft 12 which delivers useful power to a generator 13 or the like. Air from air intake 14 is compressed by compressor 10 and passed through pipe 15 which branches into the pipes 16 and 17. Pipe 16 leads into gasifier shell 18 and connects with the cooling coils 19. Heated compressed air flows from the cooling coils 19 through pipe 20 to the combustor 21.

Gasifier shell 18 has pulverized coal or the like delivered to the bed 22 by means of pipe 23. Since shell 18 is pressurized, the lock hoppers 24 and 25 and the valves 26–28 are required to introduce the coal therein from atmospheric pressure. Pipe 29 represents any suitable ash withdrawal device. A grid 30 extends across the lower end of shell 18 to support the bed 22 of pulverized coal fluidized by compressed air entering shell 18 below grid 30 through pipe 31. A booster compressor 32 increases the line pressure in the compressed air flowing from pipe 17 to that required in line 31 to fluidize the bed 22.

Gas and dust rise from the interface 33 of bed 22 into the upper portion 34 of shell 18. Separator 35 passes fuel gas through pipe 36 to combustor 21. Drop leg 37 of separator 35 returns dust to bed 22. In combustor 21 heated compressed air from pipe 20 and fuel gas from pipe 36 are burned and passed through pipe 38 to gas turbine 11 which extracts energy therefrom doing work on shaft 12. The expanded gases exhausting from turbine 11 passes through pipe 40.

The main reaction within the gasifier is the oxidation of carbon to carbon monoxide. However, the fuel gas passing through pipe 36 will also contain some methane vapors, hydrogen gas, water vapor, nitrogen, etc. As one example of this invention, if the delivery temperature of turbine compressor 10 of compressed air was 500° F. and the expander or turbine 11 inlet temperature should be 1500° F., compressed air passing through coils 19 would be heated to about 1000° F. and the fuel gas burning in combustor 21 in this heated air would be raised to 1500° F. Thus it may be seen that all the energy resulting from first the oxidation of carbon or carbon monoxide and second the oxidation of carbon monoxide to carbon dioxide is available as energy in heated gases to do work in the turbine 11.

Since the air in pipe 20 has already been heated to 1000° F. and it is presumed that the fuel gas in pipe 36 has been heated by oxidation to at least the same temperature, only one half as much fuel gas must be burned at these elevated temperatures in combustor 21 to provide the same energy as would be provided if the fuel gas was burned with air from pipe 20 at ambient temperatures. With this reduction in the amount of fuel gas required by the system of this invention, there is a corresponding reduction of the amount of dust and ash entrained into the gas turbine 11 with resulting wear. Thus the saving in required fuel gas provided by the preheating of the air in coils 19 over that amount of fuel gas which would be required if the turbine inlet temperature were raised to 1500° F. by combustion alone with air at ambient temperature, may reduce turbine wear by almost one half.

With the arrangement of this invention, the gasifier and the turbine are an integral unit which make the energy available in coal available in a form which may be directly used in a gas turbine 11. This provides many advantages for complete self-contained power plants. While the coils 19 present a slight metallurgical problem because they have oxidizing conditions on their insides and reducing conditions on their outsides, this problem may be easily solved with known materials. Further, since the pressure in shell 18 is only slightly higher than in coils 19, any leakage will be minimal.

While this invention has been shown and described in the best form known, modifications may be made without departing from the spirit and scope of the invention.

What is claimed is:

1. The process of operating a gas turbine comprising the steps of:
    (a) compressing air;
    (b) introducing coal into a gasifier;
    (c) passing some of the compressed air into the bottom of the gasifier to form a fluidized bed of coal and partially oxidize the coal to form a fuel gas containing carbon monoxide;
    (d) cooling the fluidized bed of coal in the gasifier with at least some of the remainder of the compressed air to heat the compressed air;
    (e) withdrawing the fuel gas from the gasifier;
    (f) oxidizing the fuel gas with the heated compressed air to operate the gas turbine.

2. The process according to claim 1 wherein in step (d) the fluidized bed of coal in the gasifier is cooled by the remainder of the compressed air by passing the remainder of the compressed air through coils in the fluidized bed in the gasifier.

3. The process according to claim 2 wherein in step (c) the compressed air is further compressed and passed into the bottom of the gasifier.

4. The process according to claim 1 in which about one half of the compressed air is passed into the bottom of the gasifier to partially oxidize coal therein and about one half of the compresed air is used to cool the fluidized bed in the gasifier and become heated thereby.

5. A gasifier and gas turbine system for operating a gas turbine on coal comprising, in combination:
    (a) a gas turbine;
    (b) an air compressor driven by said gas turbine;
    (c) a gasifier for the partial oxidation of coal therein;
    (d) means introducing coal into said gasifier;
    (e) means introducing some of the air compressed by said air compressor into the bottom of said gasifier fluidizing coal therein and partially oxidizing the coal to carbon monoxide to produce a fuel gas;
    (f) means directing the remainder of the air compressed by said air compressor to said gasifier to cool the fluidized coal being oxidized therein while heating the remainder of the compressed air;
    (g) means withdrawing the fuel gas from said gasifier;
    (h) means burning the fuel gas with the heated compressed air to operate said gas turbine.

6. The combination according to claim 5 wherein said means introducing some of the air compressed by said air compressor into the bottom of said gasifier introduces substantially one half of the air compressed by said air compressor into said gasifier.

7. The combination according to claim 6 wherein said means directing the remainder of the air compressed by said air compressor to said gasifier to cool the fluidized coal being oxidized therein comprises coils within said gasifier in the fluidized coal through which the remainder of the air compressed by said air compressor is passed to cool the fluidized coal and heat the remainder of the compressed air.

References Cited

UNITED STATES PATENTS

| 933,080 | 9/1909 | Lake | 60—39.46 XR |
|---|---|---|---|
| 2,718,754 | 9/1955 | Lewis et al. | 60—39.02 |
| 3,066,854 | 12/1962 | Beins et al. | 60—39.02 XR |
| 3,137,133 | 6/1964 | Wilson et al. | 60—39.02 |

CARLTON R. CROYLE, *Primary Examiner.*

U.S. Cl. X.R.

60—39.46